E. MARTIN.
Coffee Pot.
No. 102,139.            Patented April 19, 1870.
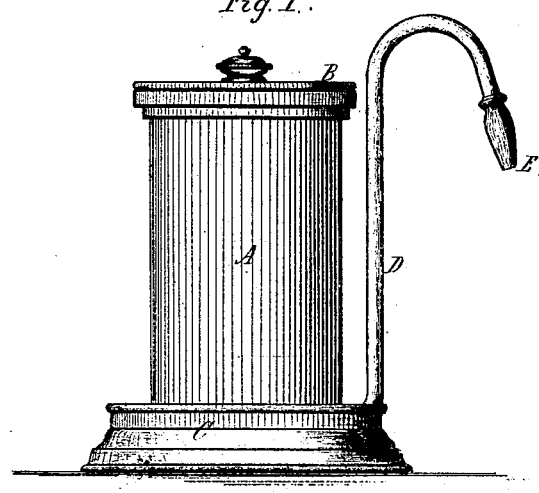
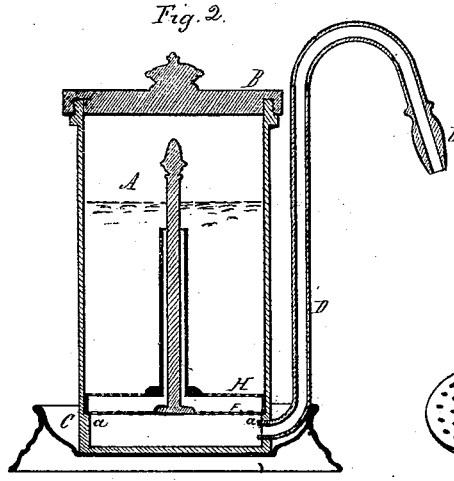
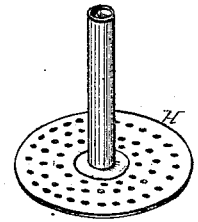
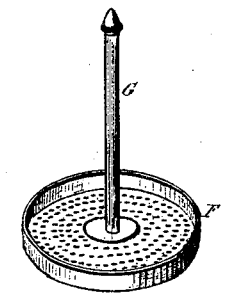

United States Patent Office.

EUGENE MARTIN, OF WATERBURY, ASSIGNOR TO HIMSELF AND BLAISE SOULES, OF BRIDGEPORT, CONNECTICUT.

Letters Patent No. 102,139, dated April 19, 1870.

---

COFFEE-URN.

---

The Schedule referred to in these Letters Patent and making part of the same

---

*To all whom it may concern:*

Be it known that I, EUGENE MARTIN, of Waterbury, in the county of New Haven and State of Connecticut, have invented a new Improvement in Coffee and Tea-Urns; and I do hereby declare the following, when taken in connection with the accompanying drawings and the letters of reference marked thereon, to be a full, clear, and exact description of the same, and which said drawings constitute part of this specification, and represent, in Figure 1, a side view, Figure 2, a vertical central section, and, in Figures 3 and 4, the two parts of the filter detached.

This invention relates to an improvement in apparatus for preparing coffee, but is also applicable to other purposes, and consists in the construction of a vessel so as to be closed steam-tight, with a tube leading from near the bottom and running up, forming a convenient means for drawing from the vessel, and also combined with a receptacle at the base of the vessel to receive the spirits to be burned, for heating the contents of the vessel; and, further, in combining with a vessel constructed as above, a filter to be set within and near the bottom of the vessel to receive the coffee, and through which the water passes, the contents being drawn from the vessel by the pressure created by generation of steam within the vessel.

A is the vessel, of any convenient or suitable form, closed by a steam-tight cover, B.

C is a base, forming a channel around the vessel, and of a size sufficient to contain the requisite quantity of spirits to boil the water, which may be placed within the vessel.

From near the bottom of the vessel a tube, D, leads up, terminating in a nozzle, E, at an elevation above the point to which the vessel is to be filled.

To boil the water, fill the vessel or place therein so much as it is required to boil; then secure the cover B, and pour the spirits into the receptacle C, and ignite it, which quickly heats the water to a boiling-point, generating the steam within the vessel, the pressure of which forces the water through the tube; therefore, so soon as the water begins to boil, it is drawn from the vessel.

To prepare tea or coffee, or for similar purposes, I form a perforated pan, F, for convenience fitted with a spindle, G. Into this pan the coffee or substance to be steeped is placed; then a perforated covering-plate, H, is set over the pan, and placed within the vessel, as seen in fig. 2, resting on a ledge, $a$, slightly above the opening into the tube D; then the requisite quantity of water is poured thereon, and caused to boil, as before described.

In boiling or heating, the water circulates in the vessel in the usual manner for boiling, and, in its circulation, passes through and through the filter, so that, as soon as steam sufficient has been generated, the water will have taken from the contents of the filter all of the desirable qualities, and will be forced through the tube into a receptacle prepared to receive it.

This invention is specially designed for preparing tea and coffee by persons traveling, or at other times where a fire is inaccessible, but as a boiler is applicable to many uses.

The tube D, which I have shown as being entirely outside the cylinder, may be otherwise arranged, it only being necessary that it opens from near the bottom of the vessel, in order to draw nearly the entire contents from the vessel.

The base C, I have constructed as independent of the vessel. This may be made a part of or fixed to the vessel, it being only essential that a suitable receptacle be arranged for the spirits necessary to generate the steam.

I claim as my invention—

1. The vessel A, with its steam-tight cover B and discharge-tube D, constructed and arranged substantially as described, and combined with the spirit-burning channel or base C, as described.

2. In combination with the foregoing, the filter, consisting of the perforated pan F and perforated plate H, arranged and operating as described.

EUGENE MARTIN.

Witnesses:
N. J. WELTON,
WM. W. BONNETT.